United States Patent Office 3,595,784
Patented July 27, 1971

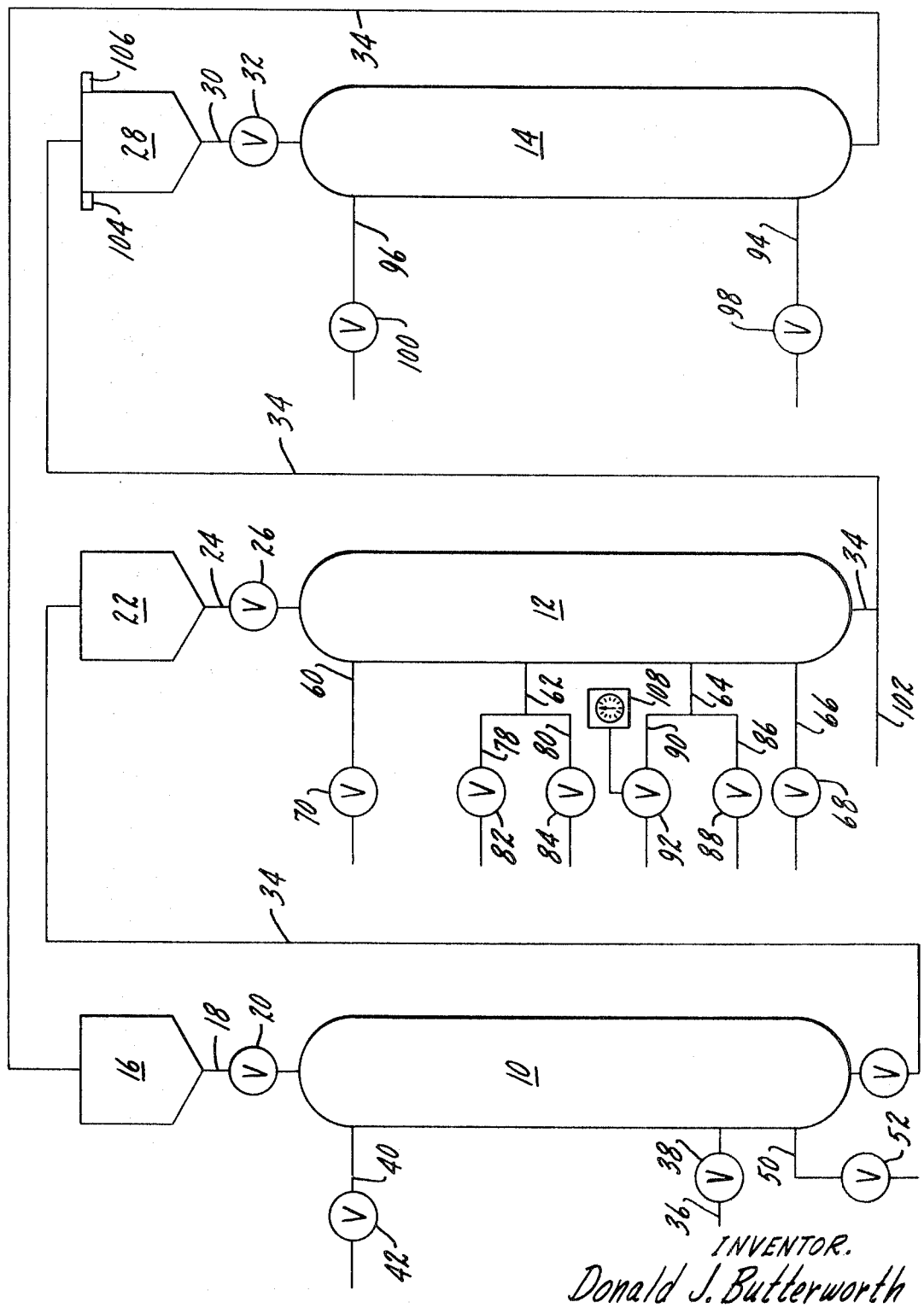

3,595,784
CONTINUOUS COUNTERCURRENT ION EXCHANGE METHOD AND APPARATUS
Donald J. Butterworth, Lyndhurst, N.J., assignor to Ecodyne Corporation, Chicago, Ill.
Filed Oct. 14, 1968, Ser. No. 767,438
Int. Cl. B01d 15/02, 15/04
U.S. Cl. 210—33
7 Claims

ABSTRACT OF THE DISCLOSURE

In a conventional continuous countercurrent ion exchange resin systems, wherein the regeneration tank has an upper resin inlet, an upper liquid outlet, a regenerant inlet below the liquid outlet, separation liquid inlet means below the regenerant inlet, and a lower resin outlet below the separation liquid inlet, a method for transferring resin is provided which insures a continuous upflow during the introduction of regenerant. The tank is filled with resin, regenerant is introduced at the regenerant inlet, and a separation liquid and supplemental separation liquid are introduced at the separation liquid inlet means to pressurize the tank and compact the resin, simultaneously forcing a minor portion of the resin out through the resin outlet. The introduction of supplemental separation liquid and the removal of resin from the tank are terminated at about the same time.

The invention also provides apparatus for carrying out the method, and comprising supplemental separation liquid inlet means communicating with the regeneration tank below the regenerant inlet, and having valve means thereon.

---

The present invention relates to an improved method for transferring and regenerating ion exchange resin, and to improvements in apparatus therefor.

Continuous countercurrent ion exchange resin systems of the type having a service tank, a regeneration tank, and a wash tank are well known in the art. In the regeneration tank, cation exchange resin is regenerated by delivering an upflow of an acidic regenerant to the resin. A substantial economic advantage may often be realized when sulfuric acid is used as the regenerant. However, the use of this acid suffers from the disadvantage that insoluble sulfate salts are formed primarily as a result of the removal of calcium and magnesium ions from the resin during regeneration. It is therefore extremely important when using sulfuric acid to maintain a continuous upflow in the regeneration tank during the regeneration process, in order that sulfuric acid and/or insoluble salts are not carried over into the wash column. It is also important to maintain a constant upflow during the introduction of regenerant, regardless of the amount of pressure buildup in the column. Such a pressure buildup may be caused by a partial clogging of the bed with an insoluble salt. That is, if efforts are made only to maintain a constant pressure in the column, the formation of insoluble salts will lead to a decreased flow rate of regenerant, which, in turn, will discourage the removal of insoluble salts from the resin.

Conventionally, upflow within a regeneration tank is maintained by introducing a "separation liquid" below the regenerant introduction point. This separation liquid maintains a major portion of the ion exchange resin compacted in an upper portion of the tank, leaving a gap or "separation" below it, containing liquid only.

Generally, the present invention relates to a method for regenerating ion exchange resin wherein an upflow is maintained in the regeneration tank during the entire time of introduction of regenerant, along with improved apparatus that facilitates the carrying out of the aforementioned method. The regeneration tank employed has an upper resin inlet, an upper liquid outlet, a regenerant inlet below the liquid outlet, separation liquid inlet means below the regenerant inlet, and a lower resin outlet below the separation liquid inlet means. In carrying out the method, a particular operational sequence is followed. First, the tank is filled with ion exchange resin particles delivered through the resin inlet. Subsequently, a regenerant, a separation liquid, and supplemental separation liquid are all introduced into the tank at predetermined flow rates. The regenerant is introduced at the regenerant inlet, and the separation liquid and supplemental separation liquid are introduced at the separation liquid inlet means. The introduction of the regenerant, separation liquid, and supplemental separation liquid pressurizes the tank to compact a major portion of the resin into an area above the separation liquid inlet means, also forcing a minor portion of the resin out of the tank through the resin outlet. After a given amount of time, the introduction of the supplemental separation liquid is terminated, and, at approximately the same time, the removal of resin from the tank is also terminated.

The apparatus of the present invention is an improvement on a conventional continuous countercurrent ion exchange apparatus having a service tank with a regenerated resin reservoir communicating with an upper portion thereof, a regeneration tank and exhausted resin reservoir communicating with an upper portion thereof, and a wash tank and metering reservoir communicating with an upper portion thereof. The overall system includes means for transferring resin from a lower portion of the service column to the exhausted resin reservoir, from a lower portion of the regeneration tank to the metering reservoir, and from a lower portion of the wash tank back to the regenerated resin reservoir. Conventionally, the regeneration tank has upper liquid outlet means, regenerant inlet means below the outlet means, and primary separation liquid inlet means below the regenerant inlet means. In accordance with the present invention, the regeneration tank is provided with supplemental separation liquid inlet means below the regenerant inlet means, together with valve means on the supplemental separation liquid inlet means.

The invention will be best understood by reference to the following detailed description, taken in conjunction with the drawing, which is a diagrammatic illustration of a continuous countercurrent ion exchange resin system embodying the features of the present invention.

Referring to the drawing, the apparatus of the present invention comprises three generally cylindrical tanks or columns arranged in series, and consisting of a service tank 10, a regeneration tank 12, and a wash tank 14. While these tanks are shown in the drawing to be of the same size, this often will not be the case, as the relative size of the tanks is adapted to the service, regeneration, and washing capacities required. In most applications, the service tank 10 will be much larger than either the regeneration tank 12 or the wash tank 14.

A regenerated resin reservoir 16 communicates with an upper portion of the service tank 10 through a resin conduit 18 having a transfer valve 20. Similarly, the regneration tank 12 has an exhausted resin reservoir 22 communicating with an upper portion thereof through a resin conduit 24 having a transfer valve 26. Finally, the wash tank 14 has a metering reservoir 28 communicating with an upper portion thereof through a resin conduit 30 having a valve 32. As with the tanks 10, 12, 14, the reservoirs 16, 22, 28 will not necessarily be the same size. Resin transfer conduits 34 are connected to permit the transfer of resin from a lower portion of the service tank 10 to the exhausted resin reservoir 22, from a lower portion of the regeneration tank 12 to the metering reservoir 28, and from a lower portion of the wash tank 14 to the regenerated resin reservoir 16.

In operation, a liquid for purification such as raw water is delivered to the service tank 10 through a service inlet 36 having a service inlet valve 38, and the purified liquid is withdrawn at a service outlet line 40 having a service outlet valve 42. A drain line 50 having a drain valve 52 communicates with the service tank 10 at a lower portion.

During operation, the service tank 10 is internally pressurized, and has a major portion of the resin compacted in an area above the level of the service inlet line 36. A void zone, containing liquid only, is formed between the service inlet line 36 and an area just above the bottom of the tank 10, where there is also some compacted resin. As it periodically becomes necessary to replace a portion of the exhausted resin in the service tank 10 with fresh resin from the regenerated resin reservoir 16, the service inlet valve 38 and service outlet valve 42 are closed, and the drain valve 52 is opened, depressurizing the tank 10. The transfer valve 20 is opened, and the bed of resin flows downwardly under the influence of gravity. Additional resin flows in from the regenerated resin reservoir 16 as a result of the opening of the transfer valve 20. After sufficient resin has entered the tank 10, the drain valve 52 and transfer valve 20 are closed, and the tank 10 is repressurized by again opening the service inlet valve 38 and the outlet valve 42. This repressurization compacts the bed, and again produces a void zone below the inlet line 36, forcing a portion of the exhausted resin through the transfer conduit 34 to the exhausted resin reservoir 22.

The regeneration tank 12 has an upper liquid outlet line 60, a regenerant inlet line 62 below the outlet line 60, and preferably near the midpoint of the tank 12, and a separation liquid linlet line 64 communicating with the tank 12 below the regenerant inlet line 62 at a point above the bottom of the tank 12. Near the bottom of tank 12 and below the separation liquid inlet line 64, a drain line 66 having a drain valve 68 communicates with the tank 12. As shown in the drawing, the upper liquid outlet line 60 has an outlet valve 70 located thereon.

The regenerant inlet line 62 is conveniently split into a concentrate inlet line 78 and a dilution liquid inlet line 80, so that the proper concentration of regenerant may be mixed immediately before introduction into the tank 12. Of course, this dilution could be performed beforehand, in which case only a single regenerant inlet line would be required. The concentrate and dilution liquid lines 78, 80 each have valves, designated respectively by reference numerials 82 and 84.

In accordance with the present invention, the separation liquid inlet line 64 communicates with a primary separation liquid line 86 having a valve 88 and a supplemental separation liquid line 90 having a valve 92. As those skilled in the art will understand, it is not necessary that the primary and supplemental separation liquid lines 86, 90 communicate with the regeneration tank 12 through a common dilution liquid inlet line 64, although this is the preferred arrangement. That is, the primary and supplemental separation liquid lines 86, 90 could each communicate with the interior of the tank 12 individually.

The wash tank 14 is the only tank in the overall apparatus that is not normally pressurized. In this tank, final cleansing of the resin is preferably carried out on a fluidized bed principle. The wash tank 14 has a cleansing liquid inlet line 94 and a cleansing liquid outlet 96, each having valves designated respectively by reference numerals 98 and 100.

In operation, during the regeneration of resin, all valves on lines leading to the regeneration tank 12 are closed except for the outlet valve 70, the valves 82, 84 on the concentrate and dilution liquid inlet lines 78, 80, respectively, and the valve 88 on the primary separation liquid inlet line 86. In addition, the valve 32 on the resin conduit 30 below the metering reservoir 28 is closed. The separation liquid is delivered under sufficient pressure to maintain the resin in the tank 12 packed above the level of the separation liquid inlet line 64, so that a void zone, containing liquid only, is present below this inlet line 64. Some additional resin will also normally be present in the bottom of the tank 12. This resin is prevented from leaving the tank 12 since the metering reservoir 28, as well as the transfer conduit 34 between the metering reservoir 28 and the regeneration tank 12, are filled with a slurry of resin.

As the separation liquid, which will ordinarily be water, travels upwardly, it mixes with the regenerant being introduced at the regenerant inlet line 62. In the case of cation exchange resin, the regenerant will normally be sulfuric acid. Both the regenerant and separation liquid are withdrawn from the tank 12 at the upper liquid outlet line 60.

As can be seen from this description, regeneration within the tank 12 takes place entirely above the level of the regenerant inlet line 62, since flow within the tank 12 is in an upward direction. Between the regenerant inlet line 62 and the separation liquid inlet line 64, the regenerated resin is given a preliminary wash to remove regenerant, together with any soluble or insoluble salts that may have formed. Below the separation liquid inlet line 64, there will be relatively little upward flow. The small amount of upward flow that does exist will be produced by liquid that enters the tank 12 from a pushwater pipe 102, which communicates with the resin transfer conduit 34 just below the regeneration tank 12. It is the function of this pushwater pipe 102 to aid in the transfer of resin between the regeneration tank 12 and the metering reservoir 28 as described herein.

Periodically, a portion of "slug" of regenerated resin is removed from the regeneration tank 12 and transferred to the metering reservoir 28. To initiate this cycle, the valves 70, 82, 84, 88 on the outlet line 60, the concentrate inlet line 78, the dilution liquid inlet line 80, and the primary separation liquid inlet line 86 are closed, shutting off flow within the tank 12. The drain valve 68 and the transfer valve 26 are then opened, depressurizing the tank. Exhausted resin from the reservoir 22 flows into the tank 12 under the influence of gravity.

At the same time, the valve 32 below the metering reservoir 28 is opened, allowing resin to flow from the metering reservoir 28 into the wash tank 14.

After the tank 12 has been nearly completely filled with loose resin, the repressurization step is initiated. The drain valve 68 and transfer valve 26 are closed, and the valves 70, 82, 84, 88 on the outlet line 60, the concentrate inlet line 78, the dilution liquid inlet line 80, and the primary separation liquid inlet line 86 are again opened. The valve 32 below the metering reservoir 28 is closed, halting the flow of resin into the wash tank 14. At the same time, in accordance with the present invention, the valve 92 on the supplemental separation liquid line 90 is opened, providing an incremental increase in upflow within the tank 12. This insures the maintenance of an overall fluid upflow within the regeneration tank 12, so that neither regenerant nor insoluble salts will be carried below the level of the separation liquid inlet line 64. The repressurization of the regeneration column 12 also forces resin out the bottom of the tank 12 through the resin transfer conduit 34 to the metering reservoir 28. When the metering reservoir 28 and transfer line 34 are filled, further transfer of resin through the conduit 34 will not be possible, and the danger of overall fluid downflow within the regeneration tank 12 is reduced. Therefore, when the metering reservoir 28 has been filled with resin, the valve 92 on the supplemental separation liquid line 90 may be closed.

As those skilled in the art will understand, most of the valves utilized in the apparatus of the present invention will be automatic valves that may be remotely controlled. The valve 92 on the supplemental separation liquid inlet line 90 may conveniently be controlled by a sensor which senses whether or not the metering reservoir 28 is full. When the metering reservoir 28 is full, the valve 92 will be closed, while when the metering reservoir 28 is not full, the valve 92 will be open. Such a sensor could comprise, for example, a beam emitter 104 aimed at a photoelectric cell 106 at the top of the metering reservoir 28. When the metering reservoir 28 is full, the beam will be blocked, while when the level drops below full, the photoelectric cell will signal for the valve 92 to open. Alternatively, the valve 92 may be controlled by a timer 108, which is set to open and close the valve 92 in accordance with the timing of the overall resin transfer cycle as hereinbefore described. That is, at times when it is known that the level in the metering reservoir 28 will drop, the valve 92 is opened, while when it is known that the metering reservoir 28 will be full, the timer 108 closes the valve 92.

The apparatus shown in the drawing will normally be used to purify or "deionize" water. Although the apparatus as shown is adapted to the use of cationic or anionic resins, it is particularly designed for the cationic type. The apparatus is also well adapted to the regeneration of cationic or anionic resins that have been separated from a mixed bed.

While the apparatus of the present invention is shown in the drawings with all three of its tanks 10, 12, 14 on the same level, in the conventional apparatus, the top of the wash tank 12 is conveniently on a level above the regenerated resin reservoir 16, so that resin may travel from the wash tank 14 to the reservoir 16 through the resin conduit 34 under the influence of gravity.

Obviously, many modifications and variations of the present invention as hereinbefore set forth will occur to those skilled in the art, and it is intended to cover in the appended claims all such modifications and variations as fall within the true spirit and scope of the invention.

I claim:

1. A method for transferring and regenerating ion exchange resin in a regeneration tank having an upper resin inlet, an upper liquid outlet, a regenerant inlet below said liquid outlet, separation liquid inlet means below said regenerant inlet, and a lower resin outlet below said separation liquid inlet, comprising: filling said tank with ion exchange resin particles through said resin inlet; introducing into said tank a regenerant at a first predetermined flow rate at said regenerant inlet, a second separation liquid at a predetermined flow rate at said separation liquid inlet means, and supplemental separation liquid at a third predetermined flow rate at said separation liquid inlet means, to pressurize said tank and to compact a major portion of said resin into an area above said separation liquid inlet means, and to force a minor portion of said resin out of said tank through said resin outlet; terminating the introduction of said supplemental separation liquid; and terminating the removal of resin from said tank while introducing said regenerant and said separation liquid, said second and said third flow rates being sufficient to maintain said major portion of said resin above said separation liquid inlet means while said minor portion of said resin is being forced out of said tank, and said second flow rate being sufficient to maintain said major portion of said resin above said separation liquid inlet means after said terminating of said removal of resin.

2. The method as defined in claim 1 wherein said separation liquid is water.

3. The method as defined in claim 2 wherein said regenerant is sulfuric acid.

4. In an ion exchange apparatus having a service tank and regenerated resin reservoir communicating with an upper portion thereof, a regeneration tank and exhausted resin reservoir communicating with an upper portion thereof, a wash tank and metering reservoir communicating with an upper portion thereof, ion exchange resin in said tanks, means for transferring resin from a lower portion of said service tank to said exhausted resin reservoir, means for transferring resin from a lower portion of said regeneration tank to said metering reservoir, and means for transferring resin from a lower portion of said wash tank to said regenerated resin reservoir, said regeneration tank having upper liquid outlet means, regenerant inlet means below said outlet means, and primary separation liquid inlet means below said regenerant inlet means, the improvement comprising: supplemental separation liquid inlet means communicating with said regeneration tank below said regenerant inlet means; valve means on said supplemental separation liquid inlet means and automatic control means operatively connected with said valve means for opening and closing said valve means to maintain a major portion of the resin in said regeneration tank above the primary separation liquid inlet means while a minor portion of said resin is being transferred from said lower portion of said regeneration tank to said metering reservoir.

5. The apparatus as defined in claim 4 wherein said primary and supplemental separation liquid inlet means communicate with said regeneration tank through a common pipe.

6. The apparatus as defined in claim 5 wherein said automatic control means include level sensing means in said metering reservoir operatively connected to open said valve means when the level of resin in said metering reservoir falls, and to close said valve means when said metering reservoir is full.

7. The apparatus as defined in claim 5 wherein said automatic control means include a timer operatively connected to said valve means, and set to signal the opening of said valve means at the time the level of resin in said metering reservoir falls, and to close said valve means when said metering reservoir is full.

References Cited

UNITED STATES PATENTS 2,767,140  10/1956  Fitch _____ 210—33
3,152,072  10/1964  Yomiyama et al. _____ 210—33

SAMIH N. ZAHARNA, Primary Examiner

U.S. Cl. X.R.
210—189, 190, 195

UNITED STATES PATENT OFFICE
CERTIFICATE OF CORRECTION

Patent No. 3,595,784           Dated July 27, 1971

Inventor(s) D. J. Butterworth

It is certified that error appears in the above-identified patent and that said Letters Patent are hereby corrected as shown below:

Column 5, line 51, after "a" delete "second".

Column 5, line 52, after "a" insert "second".

Signed and sealed this 7th day of March 1972.

(SEAL)
Attest:

EDWARD M. FLETCHER, JR.      ROBERT GOTTSCHALK
Attesting Officer             Commissioner of Patents